Feb. 28, 1961 E. A. FERRIS 2,973,072
ONE-WAY CLUTCH
Filed June 18, 1956 2 Sheets-Sheet 1
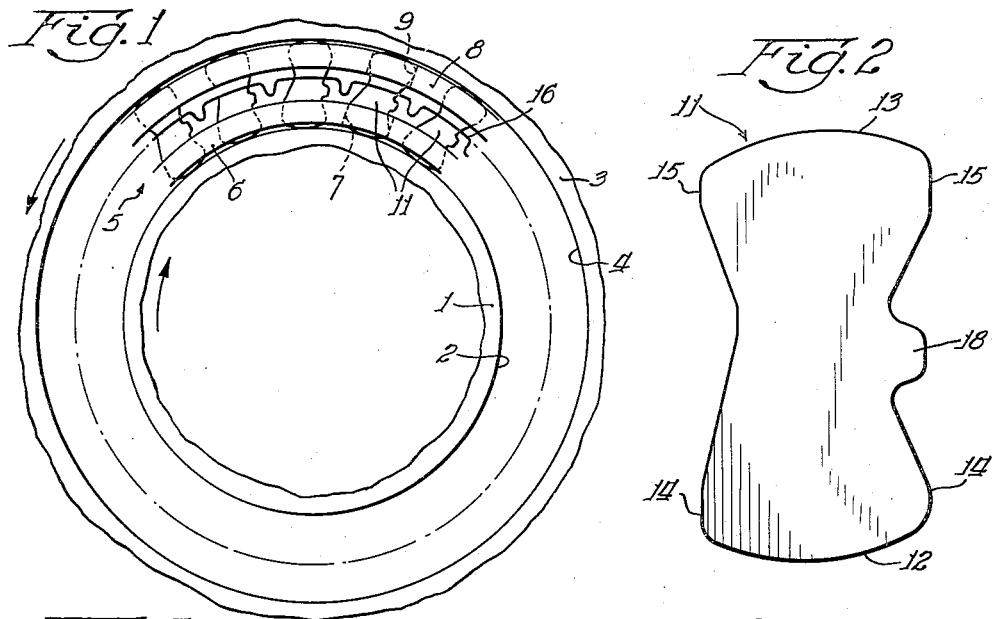
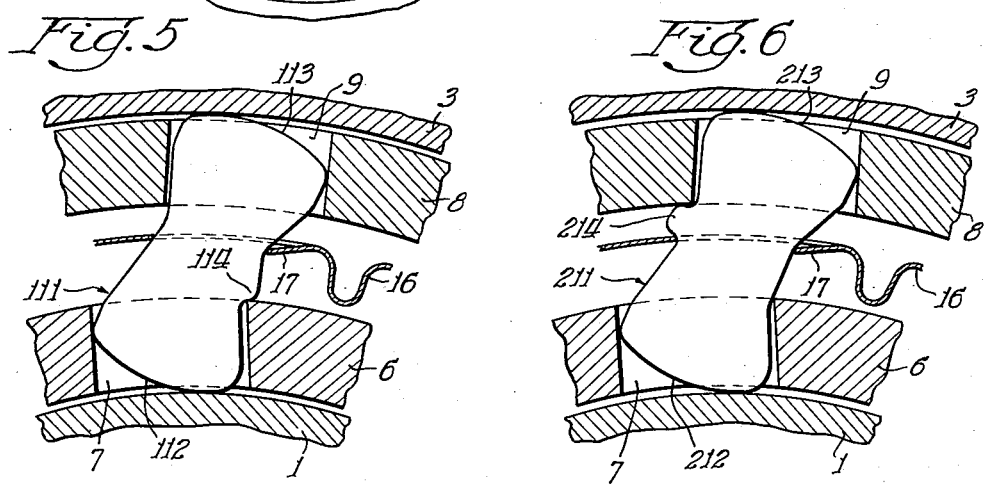
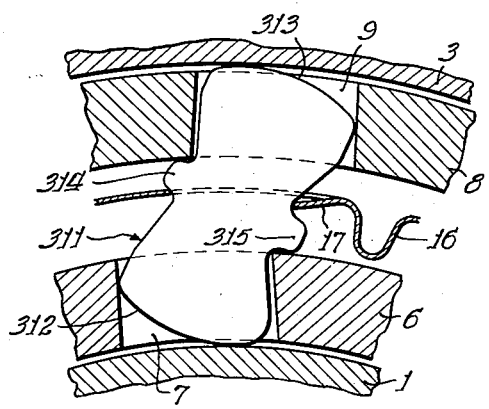
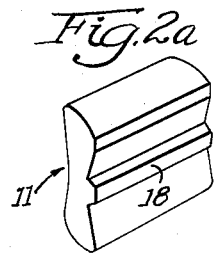
Inventor:
Ernest A. Ferris
By: Donald W. Banner
Atty.

Feb. 28, 1961   E. A. FERRIS   2,973,072
ONE-WAY CLUTCH

Filed June 18, 1956   2 Sheets-Sheet 2

Inventor:
Ernest A. Ferris
By: Donald W. Banner
Atty.

United States Patent Office 2,973,072
Patented Feb. 28, 1961

2,973,072
ONE-WAY CLUTCH

Ernest A. Ferris, Downers Grove, Ill., assignor to Borg-Warner Corporation, Chicago, Ill., a corporation of Illinois Filed June 18, 1956, Ser. No. 592,037

2 Claims. (Cl. 192—45.1)

The present invention relates to a one-way engaging device, and more particularly to a one-way engaging device of the type having cage means with tiltable grippers extending therethrough, the grippers being constructed and arranged so as to limit the degree of tilting permitted thereto.

In a one-way engaging device of a type adapted to couple a pair of relatively rotatable races which has a pair of relatively movable cage means through which the tiltable sprags or grippers extend, there is a considerable amount of energy stored in the inner and outer races by means of the sprags when the clutches are heavily loaded. If this energy is suddenly released—as would occur should there be a sudden release of the load in the drive train in which the clutch is connected—there is a considerable force on the sprags forcing them into, and in some cases beyond, their normal free wheeling position with respect to the cage means. If this energy is sufficient in amount, and is released with the requisite rapidity, at least some of the sprags may force relative rotation between the cages in the free wheeling direction to the degree that all of the sprags are lifted out of contact with one of the races, and maintained in that position because of the wedging action of at least some of the sprags between the two cages. The light energizing spring, customarily employed to maintain engagement of the sprags with both of the races, frequently does not have sufficient force in this condition to return the sprags into race engagement, the end result being complete failure of the unit.

It is therefore an object of the present invention to provide a new and improved one-way engaging device incorporating novel means to prevent excessive tilting movement of sprags or grippers beyond their normal "released" position.

Another object is the provision of a device in accordance with the preceding object in which the sprags have integral projections limiting the degree of their tilting beyond normal "released" or "free wheeling" position.

Another object is the provision of a device in accordance with the preceding objects in which there are provided a pair of relatively movable cages and a plurality of tiltable sprags extending therethrough, the sprags having integral projections adapted to engage at least one of the cages upon excessive tilting movement of the sprags.

Other objects and features of the invention will be readily apparent to those skilled in the art from the specification and appended drawings illustrating certain preferred embodiments in which:

Figure 1 illustrates a partial view in end elevation of a one-way engaging device incorporating the principle of the present invention;

Figure 2 is an enlarged side elevational view of one of the sprags illustrated in Figure 1;

Figure 2a is a perspective view of the sprag of Fig. 2 showing a projection for limiting the degree of tilt;

Figure 5 is a partial view of a first modified form of sprag in a clutch showing its "beyond released" position;

Figure 6 is a view similar to Figure 5 showing a second modification;

Figure 7 is a view similar to Figures 5 and 6 showing a third modification.

In the figures, like parts are identified by like numerals.

Figure 3:
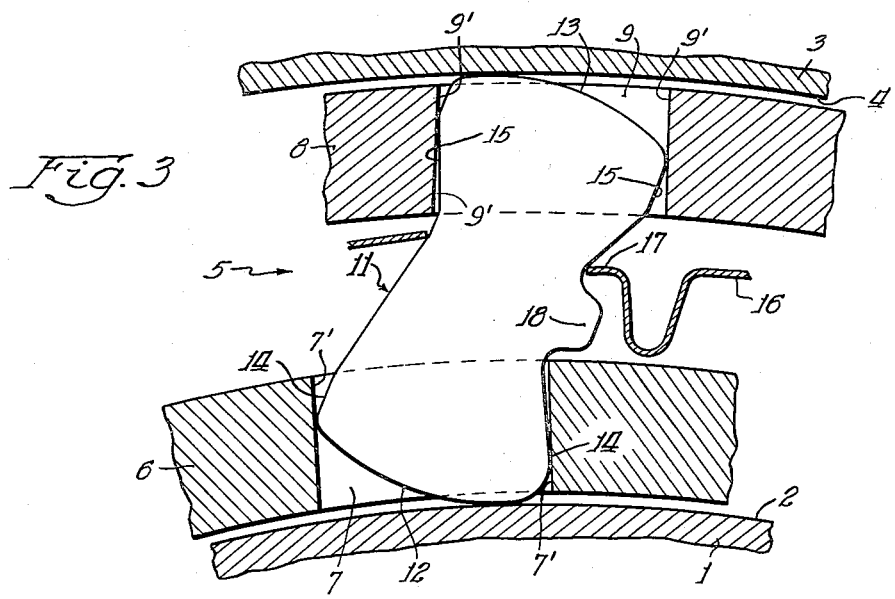
Figure 3 is an enlarged partial view of a clutch, incorporating a sprag of the type shown in Figure 2, in its normal overrunning condition.
Figure 4:
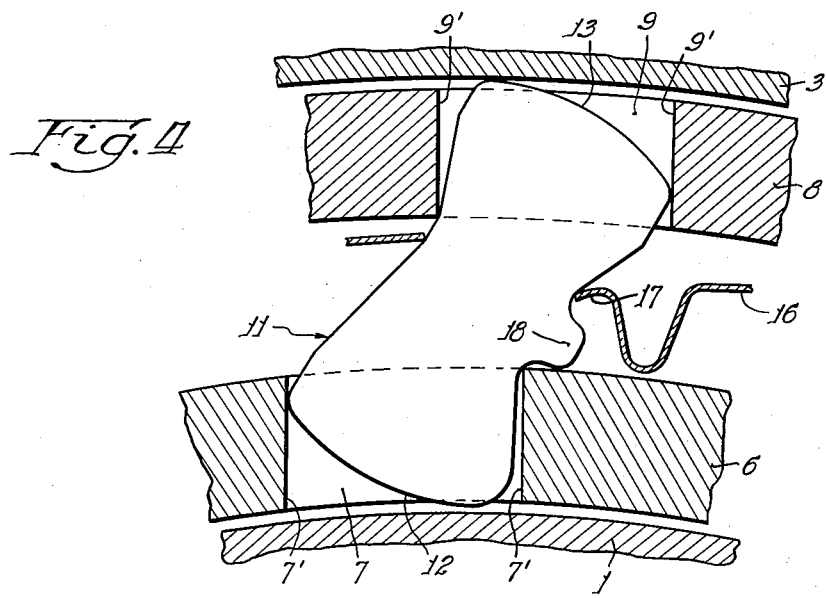
Figure 4 is a view similar to Figure 3 showing the device in its abnormal "beyond released" position.

In Figure 1 there is disclosed an inner race member 1 having an outer, generally cylindrical outer surface 2, and an outer race member 3 having an inner, generally cylindrical surface 4. Disposed between the surfaces 2 and 4 is a one-way engaging device, indicated in general by the numeral 5, which is in general similar to that described and claimed in the copending application Harry P. Troendly et al., Serial No. 379,534, entitled "One-Way Clutch," now Patent No. 2,824,636, granted February 25, 1958. This device comprises an inner rigid, metallic cage member 6 having a plurality of circumferentially spaced openings 7 extending therethrough. There is also provided an outer rigid, metallic cage member 8 having a plurality of circumferentially spaced openings 9 extending therethrough. The cages 6 and 8 are relatively rotatable, and extending through each of the openings 7 and its respective associated opening 9 is a tiltable gripper or sprag 11.

Each of the sprags 11 comprises inner and outer race engaging surfaces 12 and 13, respectively, which surfaces are curved about spaced centers within the sprag so that upon tilting of the sprags 11 in one direction, relative rotation of the races 1 and 3 is permitted, the sprags 11 when tilted in the opposite direction wedging between the races 1 and 3 and coupling them together for unitary rotation.

Each of the openings 7 and 9 is respectively defined by circumferentially spaced, straight edges (illustrated at 7' and 9' respectively in the drawings): Each of the sprags 11 is provided with lower, circumferentially facing portions 14 suitably contoured, as disclosed in the aforementioned copending application, to remain in contact with the edges 7' of openings 7 with only bearing clearance therebetween—within production limits—as the sprag 11 tilts throughout its normal operating range. Furthermore, each of the sprags 11 is provided with a pair of circumferentially facing surfaces 15 suitably contoured, as also disclosed in that copending application, to remain similarly in contact with the edges 9' of openings 9 throughout the normal tilting range of the sprags. As a result, tilting movement of each sprag is instantly transmitted to all of the other sprags throughout their normal tilting range, the sprags tilting together both in time and in degree.

Sprag energizing means are provided for biasing the sprags 11 into engagement with the races 1 and 3 when the device is in its normal operative condition, these means comprising an annular, flexible spring cage 16 having a plurality of circumferentially spaced openings therein to respectively receive the sprags 11, the cage 16 having a plurality of integral spring tabs 17 respectively engaging the sprags to bias them in the aforementioned direction, as more fully explained in the aforementioned copending application.

In the particular embodiment of the invention illustrated in Figures 1 through 4, upon attempted relative rotation of the races in the direction indicated by the arrows in Figure 1, the sprags 11 will be tilted, by virtue of the engagement of surfaces 12 and 13 thereon with the races 1 and 3 respectively, into such a position that the races 1 and 3 will be coupled together in unitary rotation. Upon relative rotation of the races 1 and 3 in the direction of rotation opposite to that indicated by the arrows in Figure 1, the sprags 11 will normally be tilted to their "released" or "free wheeling" position in which this relative rotation of the races is permitted.

It will be readily apparent by those skilled in the art when the device is in its "locked up" condition and transmitting a substantial load, if that load is released very rapidly the sprags 11 may tend to be tilted in a clockwise direction to such a degree that the surfaces 12 and 13 thereon would engage the surfaces 7' and 9' so as to wedge the sprags into the cages and out of engagement with the associated races. To obviate the possibility of this clutch failure, the present invention contemplates the provision of means integral with the sprags which will permit the sprags movement to normal "released" position, but which will prevent their movement to the aforediscussed inoperative condition. These means in Figures 1 through 4 comprise an integral projection 18 intermediate the race engaging surfaces 12 and 13 of each sprag, and positioned below the point of engagement of the spring tab 17 of the sprag energizing spring cage 16.

In Figure 3 there is disclosed the relative positions of the sprags 11 and the races and cages associated therewith in the normal "released" or "free wheeling" position of the device. It will be seen that the sprags can tilt counterclockwise from this position to their engaged position without causing any interference between the integral projection 18 thereon and the spring tabs 17.

As previously explained, however, if the clutch is under considerable load which is suddenly released, the liberated energy may be sufficient to tend to move the sprags 11 into such a position that they wedge within the cage openings. This is prevented with devices of the present invention in the manner illustrated in Figure 4 in which it will be seen that the illustrated sprag 11 has been tilted beyond the normal "released" position illustrated in Figure 3. It is very important to notice, however, that the integral projection 18 on the illustrated sprag has been moved into engagement with the outermost surface of the rigid cage 6, so that the race engaging surfaces 12 and 13 have not been permitted to move into engagement with the edges 7' and 9' respectively of the cage openings. As a result, the sprags 11 cannot wedge within the openings 7 and 9, and the spring tabs 17 of the flexible cage 16 can effect return of the sprags 11 to the position illustrated in Figure 3 immediately.

In Figure 5 there is disclosed a first modification of the sprags structure previously described. There is disclosed a sprag 111 having race engaging surfaces 112 and 113 adapted to wedge between the races 1 and 3 in exactly the same manner as previously described with respect to the surfaces 12 and 13 and the sprag 11. Intermediate the race engaging surfaces, however, there is formed a ledge 114 which is adapted to engage the upper surface of the rigid cage 6 in the abnormal, "beyond released position" illustrated in Figure 5. Preferably the ledge 114 extends axially throughout the length of the sprag 111.

In Figure 6 there is disclosed a second modification. There is illustrated a sprag 211 having race engaging surfaces 212 and 213 which wedge between the races 1 and 3 in the manner previously described. The sprag 211 has an integral projection 214 on the side thereof opposite to the spring tab 17 which, in the abnormal, "beyond released position" illustrated in Figure 6 engages the under surface of the rigid cage 8.

In Figure 7 there is illustrated a third modification comprising a sprag 311 having race engaging surfaces 312 and 313 to wedge between the races 1 and 3 in the manner previously described. The sprag 311 has a pair of integral projections 314 and 315 projecting from the opposite circumferentially facing sides of the sprag and extending throughout the axial length of the sprag 311. The projections 314 and 315, when the sprag is tilted beyond its normal "released" position, as illustrated in Figure 7 will respectively engage the under surface of the rigid cage 8 and the upper surface of the rigid cage 6 to prevent movement of the sprag 311 to the position in which it would wedge within the openings 7 and 9 of the cages 6 and 8 respectively.

In all of the illustrated forms of the present invention, excessive tilting movement of all of the sprags beyond their normal released position is prevented by providing integral means projecting from the circumferentially facing sides of the sprags and extending throughout the axial length of the sprags which engage the rigid cage means provided and thereby prevent tilting of the sprags in the "released" direction to such a degree that the device would become inoperative, or partially inoperative. Furthermore, in each of the illustrated embodiments the sprag energizing spring cage can therefore return the sprags to their normal "released" position almost immediately after the energy released by the sudden loss of load is dissipated. As a result the clutch will almost immediately return to a condition ready for immediate resumption of load. Furthermore, by preventing excessive sprag tilting, the edges defining opening in the cages are not broken off or distorted, as occasionally heretofore occurred, so that the sprags may and will remain in bearing contact with the edges of the cage openings in the manner previously described throughout the normal tilting range of the sprags. It will further be seen that these integral means on the sprag which prevent the excessive tilting may be formed very inexpensively and in the same manufacturing operation in which the sprags themselves are formed, this operation comprising the drawing of sprag wire through suitable dies.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What I claim is:

1. In a one-way engaging device adapted for use between a pair of inner and outer concentric races, a plurality of sprags generally dumbbell shaped in radial cross section so as to have axially enlarged portions at the radial ends thereof and an axially reduced section in the radial central portion thereof tiltable through a normal range including an overrunning condition and a load-carrying condition having eccentrically curved race engaging surfaces whereby the races are coupled together by the sprags during attempted relative rotation of the races in one direction and whereby the races are freely rotatable in the opposite relative direction of rotation, a pair of radially spaced and relatively rotatable rigid cages disposed between the races, means defining circumferentially spaced openings in said cages, each of said sprags extending through an opening in the inner cage and an opening in the outer cage, the contacting edges of said sprags and said openings defining means whereby the contact therebetween will be maintained throughout the normal tilting range of the sprags, spring means in engagement with said sprags adapted to bias said sprags toward engagement with the races, and circumferentially extending means integral with said sprags projecting axially outwardly from said radially central portion of said sprags and between the cages and normally out of engagement with said cages effective to engage at least one of said cages to prevent excessive tilting of said sprags beyond the normal overrunning condition thereof.

2. The device defined in claim 1 in which said circumferentially extending means extend substantially throughout the axial length of said sprags.

References Cited in the file of this patent

UNITED STATES PATENTS

| | | |
|---|---|---|
| 2,693,868 | Swenson | Nov. 9, 1954 |
| 2,886,152 | Cobb | May 12, 1959 |
| 2,886,153 | Cobb | May 12, 1959 |

FOREIGN PATENTS

| | | |
|---|---|---|
| 1,095,050 | France | Dec. 15, 1954 |